(12) United States Patent
Watt et al.

(10) Patent No.: US 10,064,121 B2
(45) Date of Patent: Aug. 28, 2018

(54) LOCALIZING A MULTICAST SERVICE

(71) Applicant: Ruckus Wireless, Inc., Sunnyvale, CA (US)

(72) Inventors: Alf Orion Zachariae Watt, San Francisco, CA (US); Ta-Chien Lin, San Ramon, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 0 days.

(21) Appl. No.: 14/855,107

(22) Filed: Sep. 15, 2015

(65) Prior Publication Data

US 2016/0007267 A1 Jan. 7, 2016

Related U.S. Application Data (63) Continuation of application No. PCT/US2014/029293, filed on Mar. 14, 2014.
(Continued)

(51) Int. Cl.
| | |
|---|---|
| *H04W 48/04* | (2009.01) |
| *H04W 76/40* | (2018.01) |
| *H04L 12/46* | (2006.01) |
| *H04W 12/08* | (2009.01) |
| *H04L 12/18* | (2006.01) |
| *H04W 48/08* | (2009.01) |

(Continued)

(52) U.S. Cl.
CPC ......... *H04W 48/04* (2013.01); *H04L 12/1886* (2013.01); *H04L 12/4641* (2013.01); *H04L 61/1541* (2013.01); *H04W 12/08* (2013.01); *H04W 48/08* (2013.01); *H04W 72/005* (2013.01); *H04W 76/40* (2018.02); *H04L 63/0227* (2013.01); *H04W 84/12* (2013.01)

(58) Field of Classification Search
CPC ............. H04L 12/1886; H04L 12/4641; H04L 61/1541; H04W 48/04; H04W 76/40; H04W 12/08; H04W 48/08; H04W 72/005
See application file for complete search history.

(56) References Cited

U.S. PATENT DOCUMENTS

| | | | | |
|---|---|---|---|---|
| 2002/0143855 | A1* | 10/2002 | Traversat | G06F 9/4416 709/202 |
| 2003/0165140 | A1* | 9/2003 | Tang | H04L 12/18 370/393 |

(Continued)

FOREIGN PATENT DOCUMENTS

CN 102598602 A 7/2012

OTHER PUBLICATIONS

PCT International Search Report of PCT/US14/29293; dated Aug. 19, 2014 (2 pgs.).

(Continued)

*Primary Examiner* — Chi H Pham
*Assistant Examiner* — Weibin Huang
(74) *Attorney, Agent, or Firm* — Stewart M. Wiener (57) ABSTRACT

Systems and methods of providing zero configuration (zero-conf) networking by a processor according to some embodiments of the inventions here may include bridging a zero-conf multicast service discovery query from a first multicast domain to a second multicast domain, and receiving a multicast service advertisement of the second multicast domain at the first multicast domain in response to the bridged multicast service discovery query.

15 Claims, 9 Drawing Sheets

Related U.S. Application Data (60) Provisional application No. 61/799,841, filed on Mar. 15, 2013.

(51) Int. Cl.
  *H04W 72/00* (2009.01)
  *H04L 29/12* (2006.01)
  *H04L 29/06* (2006.01)
  *H04W 84/12* (2009.01)

(56) References Cited

U.S. PATENT DOCUMENTS

| | | | | |
|---|---|---|---|---|
| 2007/0286100 | A1* | 12/2007 | Saaranen | H04L 67/16 370/260 |
| 2008/0040777 | A1* | 2/2008 | Aihara | H04L 12/14 726/4 |
| 2008/0267144 | A1 | 10/2008 | Jano et al. | |
| 2009/0094634 | A1* | 4/2009 | Haberman | G06Q 30/0251 725/32 |
| 2009/0245133 | A1* | 10/2009 | Gupta | H04W 48/14 370/254 |
| 2011/0103284 | A1* | 5/2011 | Gundavelli | H04L 12/18 370/312 |
| 2012/0329475 | A1* | 12/2012 | Ribaudo | G01S 5/0018 455/456.1 |
| 2013/0028176 | A1* | 1/2013 | Le Sage | H04W 12/02 370/328 |
| 2013/0091209 | A1* | 4/2013 | Bennett | H04W 4/21 709/204 |
| 2013/0091551 | A1* | 4/2013 | Rajakarunanayake | H04W 4/21 726/4 |
| 2013/0339391 | A1* | 12/2013 | Lindsey | G06F 17/30949 707/792 |
| 2014/0141826 | A1* | 5/2014 | Cordeiro | H04W 48/14 455/509 |

OTHER PUBLICATIONS

PCT Written Opinion of the International Searching Authority of PCT/US14/29293; dated Aug. 19, 2014 (5 pgs.).

PCT International Preliminary Report on Patentability of PCT/US14/29293; dated Sep. 15, 2015 (1 pg.).

Extended European Search Report of EP 14763341.6; dated Sep. 26, 2016 (13 pgs.).

Anonymous: "Wireless LAN Apple Bonjour Deployment Guide—Cisco", Oct. 15, 2012 (Oct. 15, 2012), pp. 1-15, XP055282627, Retrieved from the Internet: URL:http://www.cisco.com/c/en/support/docs/wireless/aironet-1100-series-access-point/113443-cuwn-apple-bonjour-dg-00.html [retrieved on Jun. 22, 2016] (15 pgs.).

Anonymous: "Bonjour Director Application Notes High Performance Wireless Networks Application Notes // 2 Xirrus Background", May 12, 2012 (May 12, 2012), pp. 1-5, XP055303713, Retrieved from the Internet: URLhttp://www.xirrus.com/cdn/pdf/Xirrus_BonjourDirector_AppNotes_v4_120512.pdf [retrieved on Sep. 9, 2016] (5 pgs.).

First Chinese Office Action of CN 201480028042.4 (Chinese and English translation); dated Feb. 24, 2018; (15 pgs.).

* cited by examiner

Gateway

Gateway Configuration
You can add new services and rules here!

☐ Bridge Service | From VLAN | To VLAN | Bidirectional | Notes | Actions

Create New ~ 310

| | |
|---|---|
| Bridge Service | Media Streaming |
| From VLAN | 110 ⇕ |
| To VLAN | 120 ⇕ |
| Bidirectional | ☐ two-way bridge. |
| Notes | Students access device 114 |

[ OK ] [ Cancel ]

Create New

Search terms [          ]  ⦿ Include all terms  ○ Include any of these terms

[Delete]  ⇩ 0-0 (0) ⇧

Enable Gateway Services
You can turn on/off your Gateway.
☑ Tick to enable Gateway Services.

[Dashboard] [Monitor] [Configure] [Administer]

LOCALIZING A MULTICAST SERVICE

CROSS REFERENCE TO RELATED APPLICATIONS

This application claims priority from and is a continuation of international PCT patent application PCT/US14/29293 filed 14 Mar. 2014, which claims priority to U.S. provisional patent application No. 61/799,841 filed 15 Mar. 2013, which is incorporated herein by reference in its entirety.

TECHNICAL FIELD

This application relates to the field of wireless communications systems, and more particular to wireless network configuration.

BACKGROUND

The configuration and management of a wireless communication system presents many challenges including aspects related to discovery and setup of network services and devices, security, and network performance. Conventional solutions have attempted to solve some of these issues with only limited success.

The competing goals of providing users zeroconf access to network services without comprising network performance and wireless security has yet to be solved.

SUMMARY

The present invention is directed to enabling zeroconf services across multiple domains while preventing unnecessary multicast traffic, maintaining security and improving visibility and resource allocation. Certain examples of the inventions here include methods and systems of providing zero configuration (zeroconf) networking by a processor may include bridging a zeroconf multicast service discovery query by a gateway from a first multicast domain to a second multicast domain, and receiving a multicast service advertisement of the second multicast domain at the first multicast domain in response to the bridged multicast service discovery query.

Further, certain examples may include embodiments where a zeroconf connection is established for multicast packets between the first multicast domain and the second multicast domain based on the received multicast service advertisement. Some examples include embodiments where the multicast domains are Virtual Local Area Networks (VLANs) mapped to separate service set identifiers (SSIDs).

Some examples may include embodiments including fencing access to a zeroconf service from the second multicast domain to the first multicast domain by the gateway on the basis of a pre-determined proximity. Embodiments may also include the pre-determined proximity includes at least one of a proximity to an access point (AP), AP group, radio frequency (RF) neighbors, and geographic area.

Some embodiments may include embodiments including fencing access to a zeroconf service from the second multicast domain to the first multicast domain by the gateway on the basis of a set of predetermined multicast addresses.

Some examples may include embodiments including filtering by the gateway of the bridged multicast communication between the first multicast domain and the second multicast domain on the basis of a service type.

Example embodiments here may include a gateway providing zero configuration (zeroconf) networking including a transceiver bridging a zeroconf multicast service discovery query from a first multicast domain to a second multicast domain, and the transceiver forwarding a multicast service advertisement of the second multicast domain to the first multicast domain in response to the multicast service discovery query bridged from the first multicast domain.

Further, certain examples may include embodiments where the transceiver establishes a zeroconf connection for multicast packets between the first multicast domain and the second multicast domain based on the received multicast service advertisement. Some examples include embodiments where the multicast domains are Virtual Local Area Networks (VLANs) mapped to separate service set identifiers (SSIDs).

Some examples may include embodiments including a processor fencing access to a zeroconf service from the second multicast domain to the first multicast domain on the basis of a pre-determined proximity. Embodiments may also include a processor fencing access to a zeroconf service from the second multicast domain to the first multicast domain on the basis of a set of predetermined multicast addresses.

Some embodiments may include embodiments including a processor filtering the bridged multicast communication for service between the first multicast domain and the second multicast domain on the basis of a service type. Embodiments may also include the gateway provided on a trunk port of the multicast domains.

Embodiments described here include a zero configuration (zeroconf) networking system includes a processor configured to bridge a zeroconf multicast service discovery query from a first multicast domain to a second multicast domain, and receive a multicast service advertisement of the second multicast domain at the first multicast domain in response to the bridged multicast service discovery query.

Further, certain examples may include embodiments where the processor establishes a zeroconf connection for multicast packets between the first multicast domain and the second multicast domain based on the received multicast service advertisement. Some examples include embodiments where the multicast domains are Virtual Local Area Networks (VLANs) mapped to separate service set identifiers (SSIDs).

Some examples may include embodiments including the processor configured to fence access to a zeroconf service provided from the second multicast domain to the first multicast domain on the basis of a pre-determined proximity. Embodiments may also include the processor configured to fence access to a zeroconf service provided from the second multicast domain to the first multicast domain on the basis of a set of predetermined multicast addresses.

Some examples may include embodiments including the processor configured to filter the bridged multicast communication for service between the first multicast domain and the second multicast domain on the basis of a service type.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Certain example systems implementing zero-configuration (zeroconf) networking over IP allow users and applications to locate devices and services over a same local Virtual Local Area Network (VLAN) without manual intervention. Some implementations of zeroconf networking operate using Domain Name System Service Discovery (DNS-SD) and multicast Domain Name System (mDNS). The DNS-SD service allows services to be advertised over traditional unicast DNS servers or by mDNS on a local link. The mDNS service sends standard DNS queries and responses to a known link-local multicast address.

For example, a client device searching for a service will browse for a zeroconf supported service within a domain by sending a multicast query to discover all instances of a particular service. An mDNS responder outputs a multicast response of all the services that it offers (e.g., file sharing, printing, media playback). The client device receives the list of services and then selects one for connection.

However, zeroconf multicast traffic may be limited to broadcast within a single network and does not provide communication to devices or services across multiple VLANs. Conventionally, zeroconf implementations are limited to a local multicast domain, which could be a subnet or a VLAN, where devices can only see network service announcements from other devices within the same domain. This may be adequate for a local multicast domain having a small number of devices within a limited geographic area such as a small office operating on a single VLAN, however, the local multicast domain may be generally determined by the wireless coverage spread that may encompass many devices in the same logical grouping such as, for example, up to 255 devices in a C-class network. A local network containing such a large number of devices may include copies of the same type of device providing duplicate services. For example, in a school building with at least one zeroconf printer provided in each classroom, the broadcasting of each printer for service discovery may provide an unwieldy list of printers for connection. Consequently, network flooding may occur in networks with many devices. Problems due to flooding include overloading of the network, errors relating to multicast packets that cannot cross IP subnets, as well as other issues related to access control and privacy.

Zeroconf services may be provided to numerous users which may require separate VLANs for different groups of users. For example, in an academic setting, a VLAN for a teacher network with a first security policy and a VLAN for a student network with a second security policy may be configured. Devices of the teacher network and the student network may be authenticated through Active Directory. However, these separate VLAN networks may be unable to access zeroconf services across networks because the devices cannot authenticate to the Active Directory across different networks. For instance, a tablet device of the student VLAN may be unable to view or connect to a teacher VLAN printer. Some examples may add the unsecured teacher printer to the student VLAN and remove the requirement for security authentication.

Bridging

In certain embodiments, a multicast gateway forwards service discovery messages across mutually exclusive domains to improve multicast-based wireless communication systems. When a system according to certain embodiments described herein transmits a service announcement for network service from a first VLAN, the system may act as a proxy to rebroadcast that service announcement to a second VLAN such that a device of the first VLAN is able to select and connect to the network service of the second VLAN.

Figure 1A:
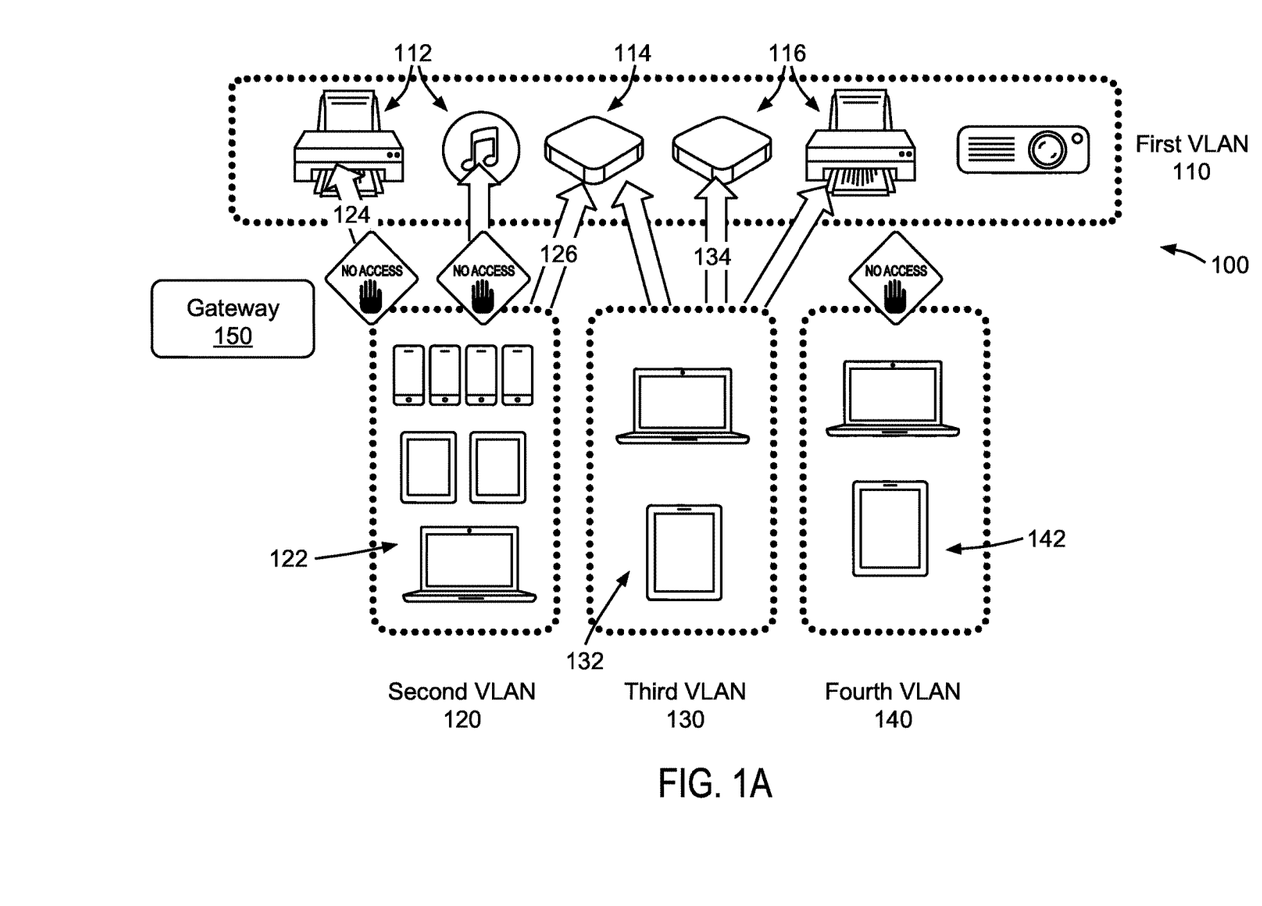
FIGS. 1A-1B are illustrative block diagrams of a network configurations 100, 101 related to network access according to some embodiments of the invention.

FIG. 1A is an illustrative block diagram of a zeroconf network configuration 100 providing device access according to some embodiments. A first VLAN 110 includes a set of devices 112, 114, 116 providing services to other devices including but not limited to file sharing, printing, media playback, etc. A device that provides a service to another device may be referred to as a service point while the device that utilizes the service of the service point may be referred to as a client device. A second VLAN 120 includes a set of devices 122, the third VLAN 130 includes a set of devices 132 and the fourth VLAN 140 includes a set of devices 142. In conventional zeroconf networks, devices within a particular VLAN are able to transmit a multicast query for a service only to other devices within the same VLAN such that any of the services provided by the first VLAN are not accessible to the devices 122, 132, 142.

However, FIG. 1A illustrates bridging of the VLAN networks 120 and 130 to the first VLAN 110 via gateway 150 to gain access to zeroconf services and devices. Gateway 150 is a multicast gateway controller provided to receive and forward service discovery announcements (protocol advertisement) and subsequent multicast packets across VLANs. The gateway 150 is provided on a trunk port with visibility to at least the VLANs 110, 120, 130 that support multicast bridging.

For the sake of explanation, the network configuration 100 in FIG. 1 may be conceptualized within a school environment where the first VLAN 110 includes a set of classroom devices offering services, the second VLAN 120 include student devices, the third VLAN 130 is reserved for teacher devices and the fourth VLAN 140 is provided for guests.

One example network setup may include the VLANs 110, 120, 130 mapped to separate SSIDs which are all on separate subnets or multicast domains. The three networks host different devices for different groups: 1) Classroom network 110 having classroom SSID with WEP authentication which include devices providing file sharing and file backup, and a media extender device attached to a projector; 2) Student network 120 where students have a separate SSID with no authentication requirement. The students may backup their tablet devices to the classroom network but should not have access to the media extender/projector or file sharing services; 3) Teacher network 130 having a teacher's SSID with 802.1X authentication for access to all classroom resources of network 110.

In the example shown in FIG. 1A, the gateway 150 is configured to provide a bridge 134 between the third VLAN 130 and the first VLAN 110 to allow devices 132 access to services of the devices 114, 116 of device VLAN 110. The gateway 150 verifies reachability between subnets before letting queries or responses cross the bridge and is attached to a VLAN trunk port off the networks or provided within an access point. Multicast traffic 134 between VLANs 110 and 130 is configured and facilitated by gateway 150.

In the example, service discovery begins when a device 132 of third multicast network 130 transmits a multicast service discovery query/service announcement for a zeroconf service to the network 130 and the gateway 150. The other devices within the network 130 receive the multicast query and respond with a list of advertised services back to the device 132. The gateway 150 determines bridge permissions/settings and bridges the multicast service discovery query of the device 132 to the first multicast network 110.

Figure 1B:
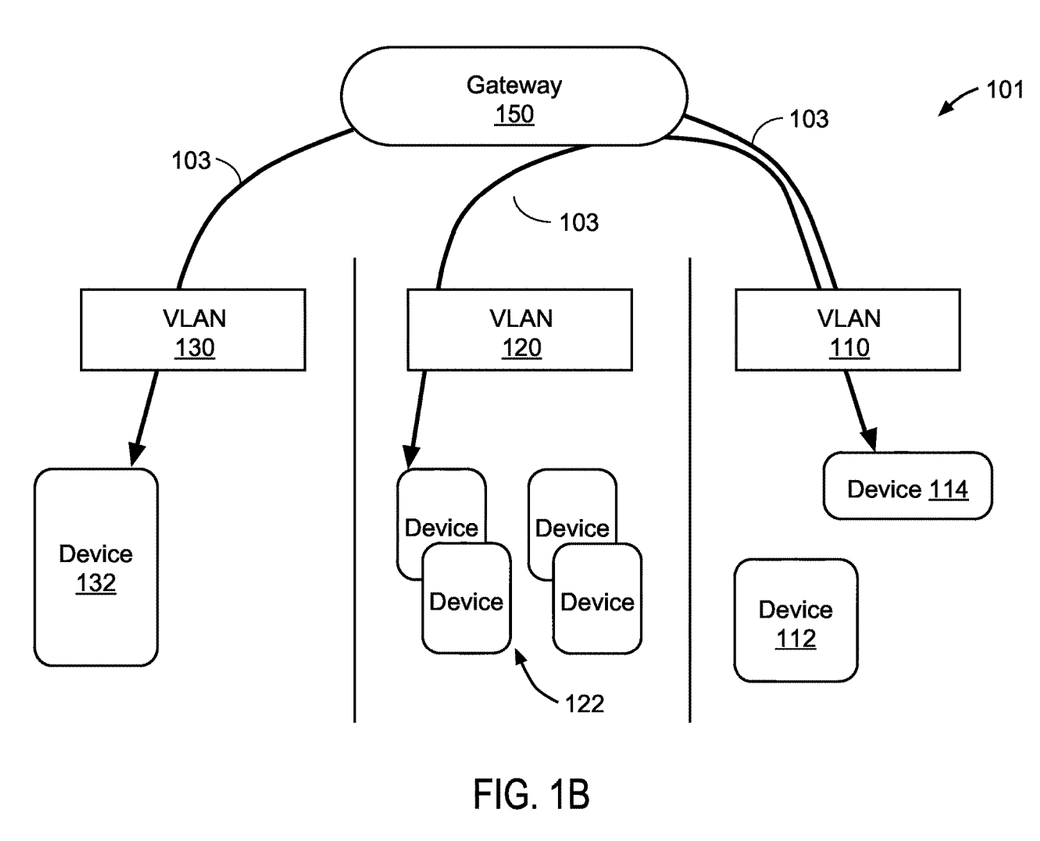

Next, in the example, the devices 112, 114 and 116 within the first multicast network 110 receive the forwarded multicast message and respond to the gateway 150 with a multicast service advertisement that includes a list of advertised services. This is shown in the block diagram of FIG. 1B in the network configuration 101. FIG. 1B illustrates that device 114 responds to the service discovery query of device 132 with a list of advertised services 103 to the gateway 150 that is subsequently forwarded to networks 120, 130 by the bridging provided by the gateway 150. The third multicast network 130 receives the multicast service advertisement of the first multicast network 110 in response to the bridged multicast service discovery query.

Returning to the example of FIG. 1A, once the device 132 receives the list of advertised services offered by devices within the first and third networks 110, 130, a selection for an advertised service is made by device 132. Thereafter, a zeroconf connection for multicast packets is established between the third multicast domain 130 and first multicast domain 110 based on the service selected from the received multicast service advertisement. The device 132 thus seamlessly connects to the media playback service of device 114.

In the example embodiment, the gateway 150 thus provides access control that allows multicast packets provided in one subnet to become visible on another subnet as desired. Network bridging between broadcast domains including VLANs and/or routed segments allows zeroconf devices to be made available to a potentially larger user base across multiple broadcast domains and further reduces multicast storms that would be otherwise induced by mDNS and zeroconf protocols such as Bonjour. Bonjour is one example of a company's zeroconf implementation, and is used for exemplary purposes only. Furthermore, the use of multiple VLANs reduces network overloading by splitting network load between the VLANs.

Network Fencing

In environments such as an academic setting, office building or a hospitality environment, the number of devices detectable within a domain may be too cumbersome to manage due to signal propagation extending beyond a range appropriate for the density of devices in the environment. In large network deployments such as a school, a single VLAN may have hundreds of zeroconf services broadcasted to browsing clients.

In certain embodiments, localness is applied to multicast discovery service through network and multicast fencing. Some embodiments implement a network fence which reduces the scope of the local network domain by restricting service advertisements to a specific wireless access point (AP), AP group, RF neighbors, physical area, or other desired grouping. Thus, some embodiments facilitate and manage service advertisement without the undue burden of overloading the wireless mesh network with multicast traffic.

Fencing reduces security concerns and increases privacy by selectively restricting visibility of devices and services. Fencing also addresses scalability concerns in large networks where, for example, every classroom or dorm room has a localized service point, such as a printer or media playback device.

Network and multicast fencing allow for services and multicast frames to be restricted to a particular scope or a pre-determined proximity including a single AP, a group of APs, RF neighbors or a particular geographic location hereinafter referred to as a geo-fenced area. A gateway fences access to a zeroconf service from within a multicast domain and between multicast domains on the basis of a pre-determined scope such as proximity. This may be advantageous for hospitality and residential installations including hotels and dormitories with a large number of users that can be grouped according to at least one desired characteristic including AP, RF neighbors, geo-fenced area, etc.

Multicast fencing provides multicast traffic without flooding an entire broadcast domain by restricting multicast service transmission to a set of predetermined multicast addresses, for example, to restrict mDNS or UPnP traffic to a fenced area. A gateway fences access to a zeroconf service from within a multicast domain and between multicast domains on the basis of a set of predetermined multicast addresses. Multicast fencing provides an alternative to suppressing multicast traffic entirely which balances the demands of end users and the need to maintain performance across the networks.

For instance, a multicast service may be localized based on physical proximity of a client device to a service device so as to improve service access to end users and reduce the potential for multicast storms that are otherwise commonly found in enterprise networks.

To determine a physical proximity to a service point providing a zeroconf service to a client device, a location of the service point and the client device may be determined. A location of a client device may be determined using any known method including Wi-Fi based position tracking, in-chip network-based positioning, relation to known radio devices (e.g., AP), connection to a peer device, or by other external means. A location of a service point may be determined by similar techniques or may be input by the user such as during initial authentication.

Based on the locations of the service points and the client devices, a gateway may generate a fence that excludes service points/client devices outside a predetermined geo-fenced area to the service user so that only locally relevant service information is provided to an interested client device.

Using the previously discussed school example, fencing may limit the broadcast traffic from a student domain to just a subset of devices in a device domain based on geo-location. For example, a student at a particular grade level may form a zeroconf bridge connection between the student network and the service device network via the gateway, but be fenced so as to be limited to broadcasting traffic to a single AP corresponding to the student's homeroom or a group of APs corresponding to the classrooms of that particular grade level. Other devices within the device domain, such as those provided in administrative buildings or other grade level classrooms are fenced off from providing service to that client device.

In another example, students and a teacher in one classroom may be fenced to receive multicast packets from service devices of a service network within that classroom without receiving multicast packets from service devices outside the classroom. Another example includes imposing certain controls in physical locations so as to provide service points within predetermined geographic areas.

Filtering

In some embodiments, filtering splits the devices within a broadcast domain into subdomains. Filtering may include generating client isolation groups where these groups are based on service policies that can allow different services to be individually configured. For example, in a wireless-mesh-enabled network, client isolation may be imposed globally on the wireless service network to permit internet service while restricting device-to-device communications in the local environment. Such restriction on local network traffic may extend to broadcast and multicast packets, such as mDNS frames and can help prevent network overload, which is an issue that a wireless mesh network can be sensitive to.

Filtering by service type is useful to prevent flooding of multicast traffic across bridged networks. Some embodiments allow local services to be advertised without overloading the mesh with multicast traffic and even permitting services among devices of the same user based on filtering rules. For example, a configuration may allow selected services such as network printing information to be multicast to a portion of the multicast domain on a per group or per user service policy basis. Referring back to the school example, a student VLAN may include different subdomains of students including a chemistry student group, art student group and engineering student group each with a respective service policy having different levels of access to a printer. Service policies may also implement service type control with billing of the services.

Figure 2:
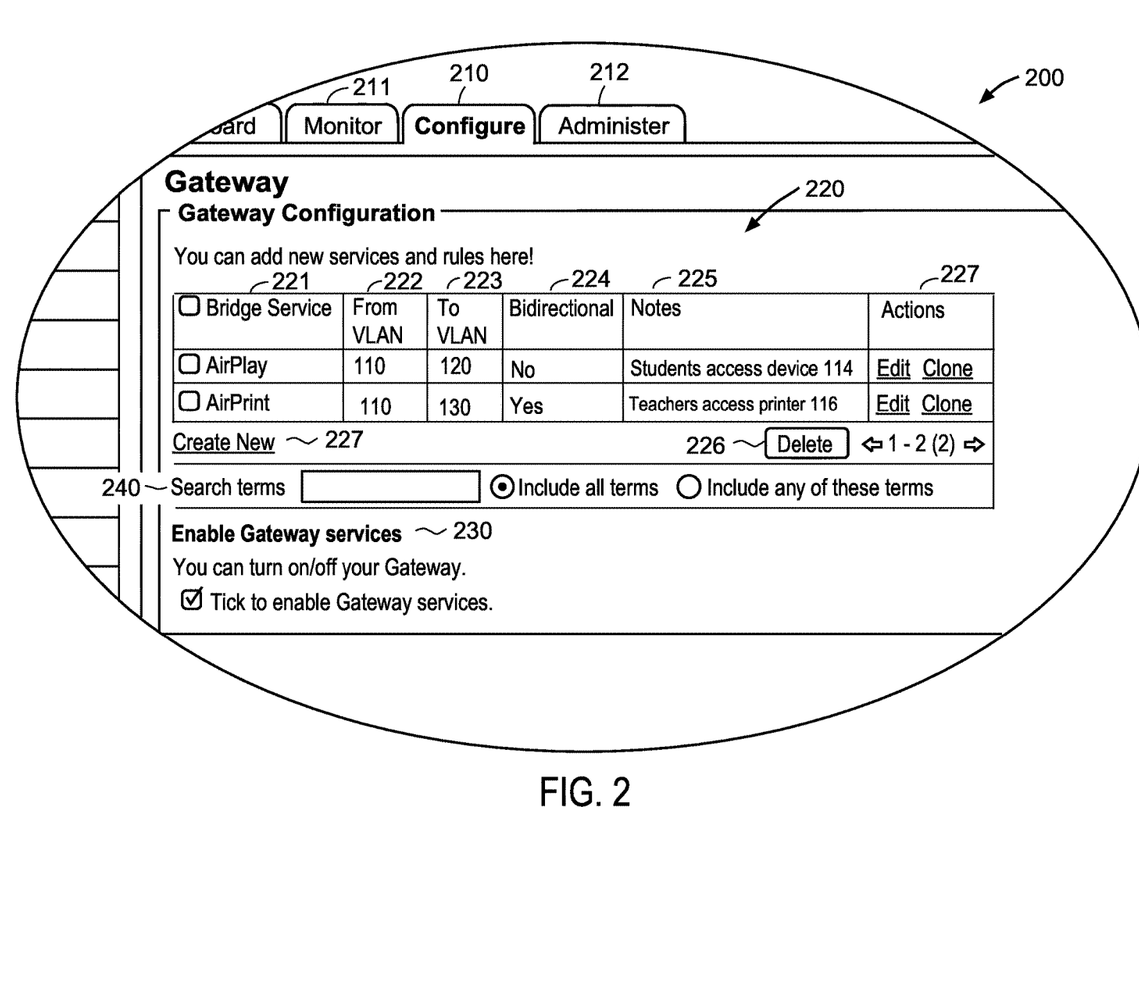
FIG. 2 is an illustrative gateway configuration graphical user interface 200 according to some embodiments of the invention.

As discussed above, a multicast gateway controller may be configured to provide different levels of access per device and network. FIG. 2 is an illustrative controller configuration graphical user interface (GUI) 200 according to some embodiments. The controller may provide simplified management and optimization of service discovery over Wi-Fi of zeroconf protocols including Universal Plug and Play (UPnP) and Bonjour, for example.

The gateway configuration GUI 200 of FIG. 2 illustrates an example gateway providing zeroconf bridging of the networks in FIG. 1A. A configured gateway may filter bridged multicast communication for service between multicast domains on the basis of selectable options including service type. The GUI 200 example includes a configure 210 page, monitor 211 page, and administer 212 page. Based on the configuration, the controller proxies zeroconf service announcements from one network domain to another network domain.

The configure 210 page includes a set of options 220 that determine the rules for mapping the system. The Bridge Service 221 field indicates the service type selected to bridge between VLANs such as media playback and printing. Non-selected services may be filtered out from communication by the gateway. A DNS-SD service type may also be input directly. The From VLAN 222 field indicates the VLAN that provides service advertisements in response to a service query from a device of the To VLAN 223 network. The To VLAN 223 field indicates the VLAN requesting bridge service. The To VLAN 223 network may request a service from its own domain as well as the domain indicated in the From VLAN 222 field.

Next, the Bidirectional 224 field may indicate whether the devices in the From VLAN 222 field are able to view and connect to services advertised on the To VLAN 223 field. The Notes 225 field provides a description of the bridge connection for user reference.

The Delete 226 icon may be used to inform the system to remove a selected bridge connection. However, a deleted bridge connection may be prefilled when a new bridge record is created after selection of the Create New 227 icon so that a deleted bridge connection entry can be quickly re-instated or modified. Other Actions 227 are selectable by the user and may include editing and/or cloning. Search bar 240 may allow a desired bridge connection to be listed based on input terms. Zeroconf Bridge functionality 230 may be enabled or disabled as desired. The controller configuration GUI 200 thereby allows multicast traffic to be selectively bridged.

Figure 3A:
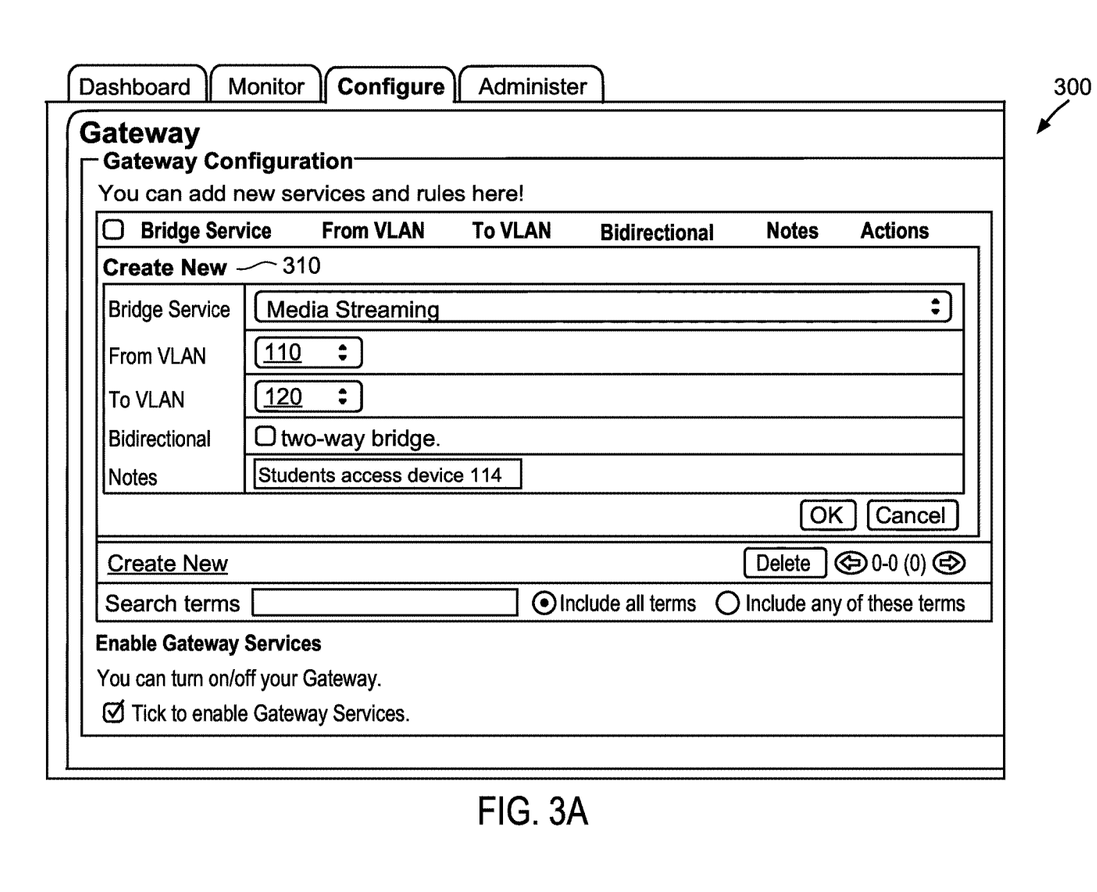
FIGS. 3A-3C are illustrative gateway configuration graphical user interfaces 300, 301, 302 according to some embodiments of the invention.
Figure 3B:
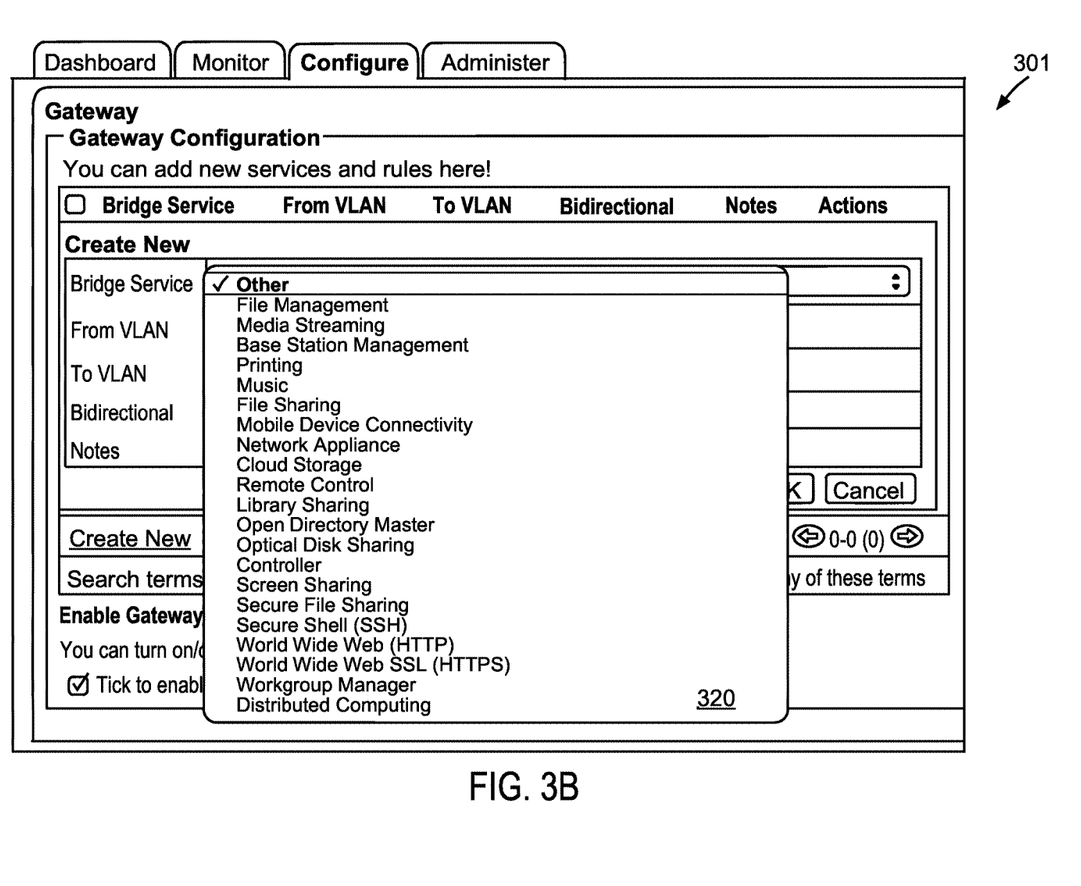
Figure 3C:
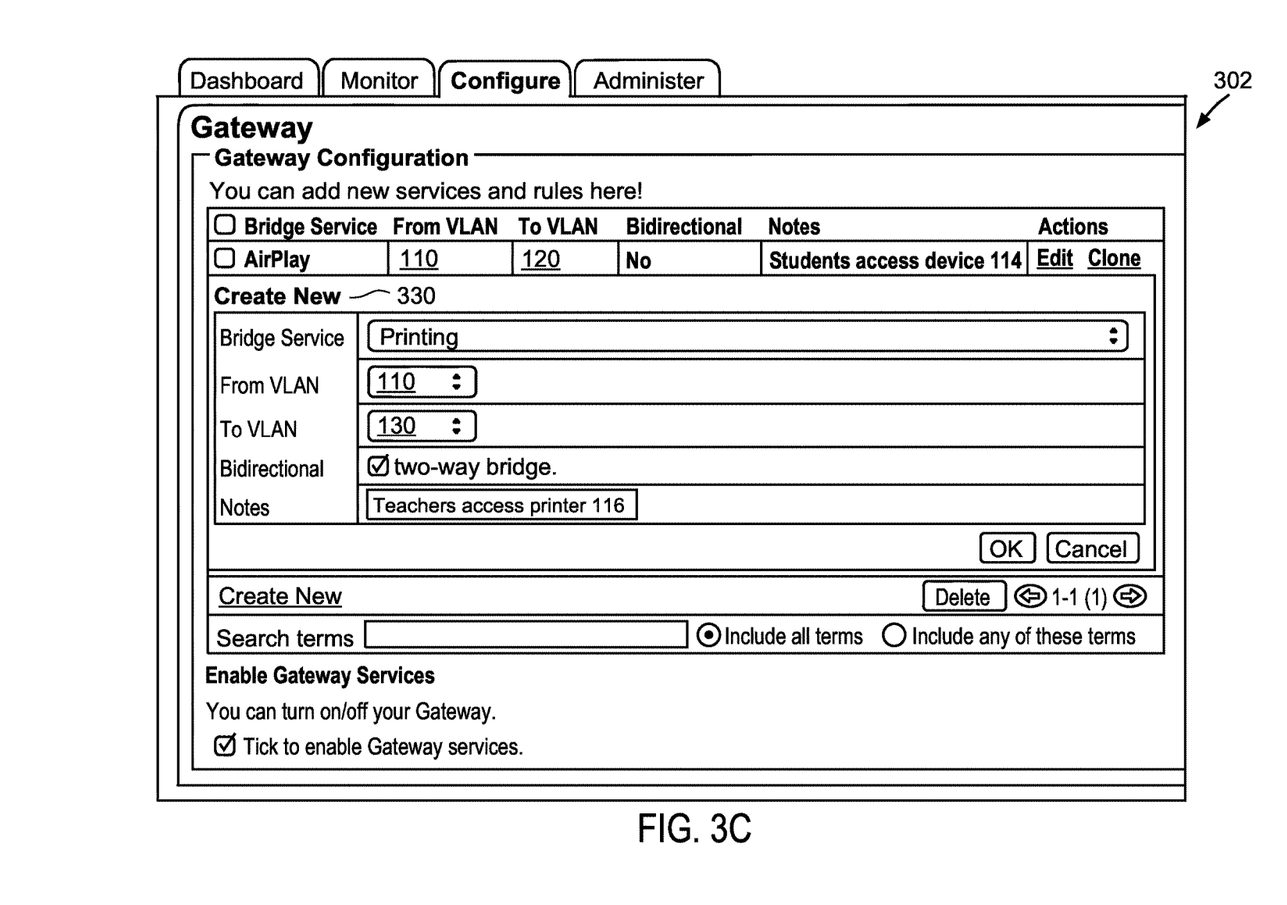

FIGS. 3A-3C are illustrative gateway configuration graphical user interfaces 300 according to some embodiments of the invention. FIG. 3A shows an example configuration 300 page where a new bridge service 310 is created. Users are provided drop down menus or other input fields to define the options 220 discussed above in FIG. 2. FIG. 3B provides a configuration 301 page illustrating a drop-down menu 320 that serves as a form of access control for selection of a type of bridge service between domains to a set of services. After the bridge from VLAN 110 to VLAN 120 is created, another bridge from VLAN 110 to VLAN 130 may be created as shown in configuration 302 page in FIG. 3C.

Referring back to FIG. 1A, the gateway 150 may determine that devices 142 of fourth VLAN 140 are denied access to the services of the first VLAN 110 since a bridge connection for the fourth VLAN 140 has not been created. As such, network service announcements from devices 142 are not forwarded to the first VLAN 110 and vice versa.

Next, the gateway 150 may provide the second VLAN 120 with limited access to first VLAN 110 in that multicast traffic 124 directed to services provided by devices 112 are denied by the gateway 150, while a bridge 126 is formed between the first VLAN 110 and second VLAN 120 for services of the device 114.

Figure 4:
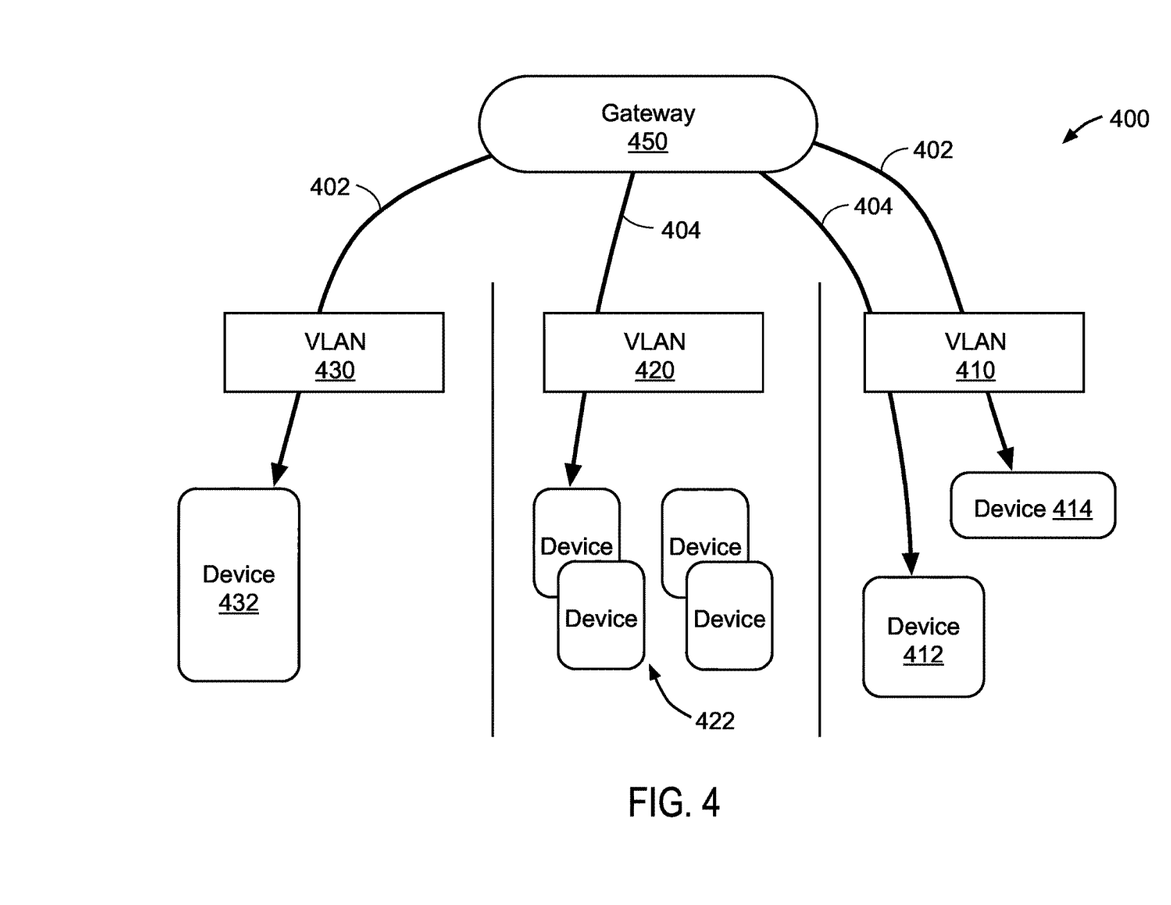
FIG. 4 is an illustrative block diagram of a network configuration 400 related to network access to services according to some embodiments of the invention.

FIG. 4 illustrates an example of multicast filtering in network configuration 400 including the networks 410, 420, 430 and gateway 450. Without selective filtering, zeroconf discovery services may be rebroadcast by a gateway to every bridged domain. This may create excessive broadcast traffic as well as unnecessarily expose services network wide. In the example of FIG. 4, device 432 of network 430 broadcasts multicast packets 402 to the gateway 450 that filters service discovery to specified networks/devices. Likewise, device 422 of the network 420 transmits multicast service discovery 404 to the gateway 450 and forwards the message only to the network 410 to prevent excessive broadcast traffic. The service discovery requests are received by the devices 414, 412 and those devices respond back to the gateway 450. The gateway again filters the responses and determines that the response to the request 402 is forwarded just to the network 430 while the request 404 is also forwarded just to the network 420. Filtering across bridged domains thus prevents network flooding and increases security.

Figure 5:
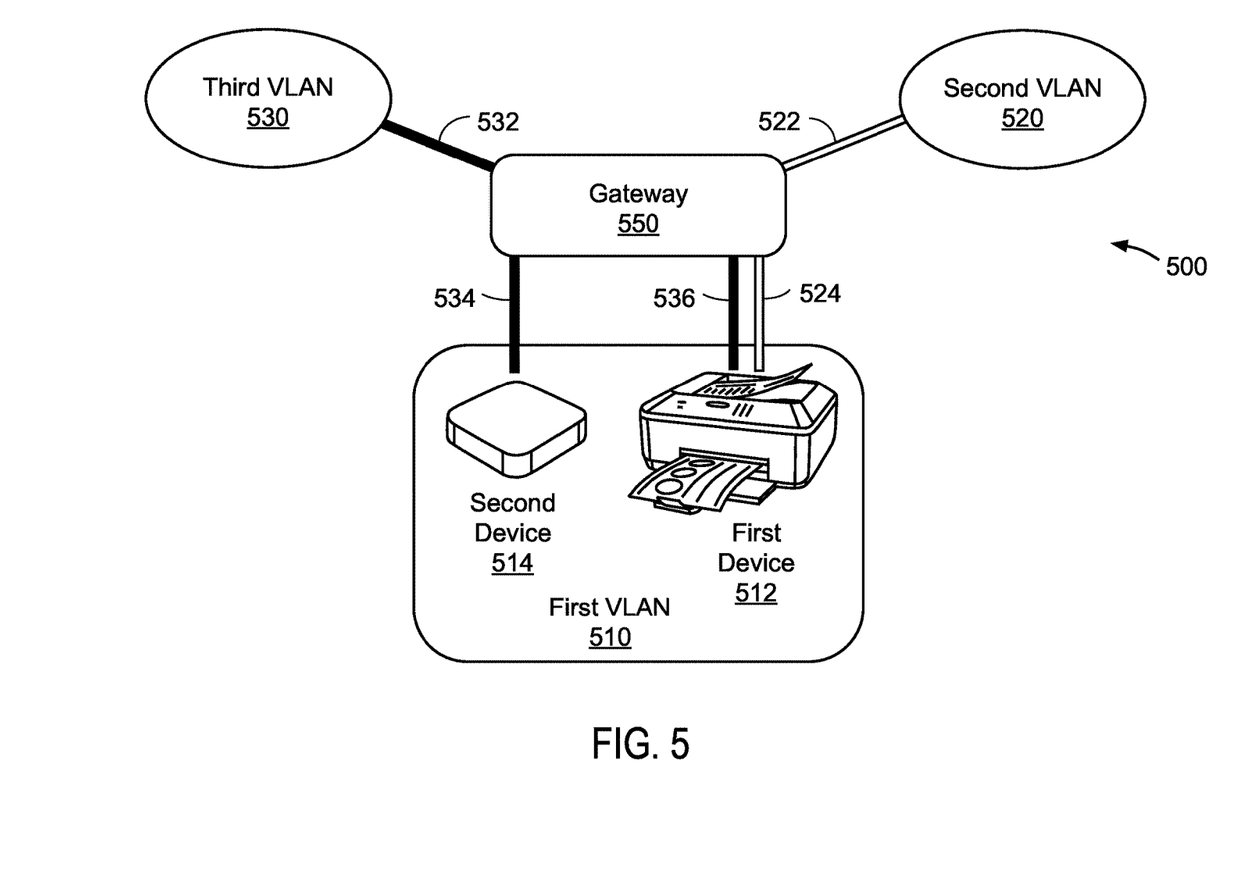
FIG. 5 is an illustrative block diagram of a network configuration 500 related to network access according to some embodiments of the invention.

FIG. 5 is an illustrative block diagram of multicast filtering within a network configuration 500. First network 510, second network 520 and third network 530 are provided and are linked by gateway 550 to provide zeroconf services across these domains. The gateway 550 filters multicast traffic 522 from the second network 520 to the first network 510 by bridging service only from the network 520 to the first device 512 of the first network 510 via connections 522, 524. Multicast packets from the second network 520 to the second device 514 of network 510 are not forwarded by the gateway 550. Next, gateway 550 forms a bridge between third network 530 and first network 510 that allows multicast traffic 532 between both first device 512 and second device 514 via bridge connections 534 and 536, respectively.

FIG. 5 illustrates an example of customized network access with granular control of services that prevents multicast traffic across multiple domains from flooding the networks. Zeroconf bridges without filtering between client devices and service points may create significant amounts of multicast traffic and may undesirably allow services to be available too widely.

Figure 6:
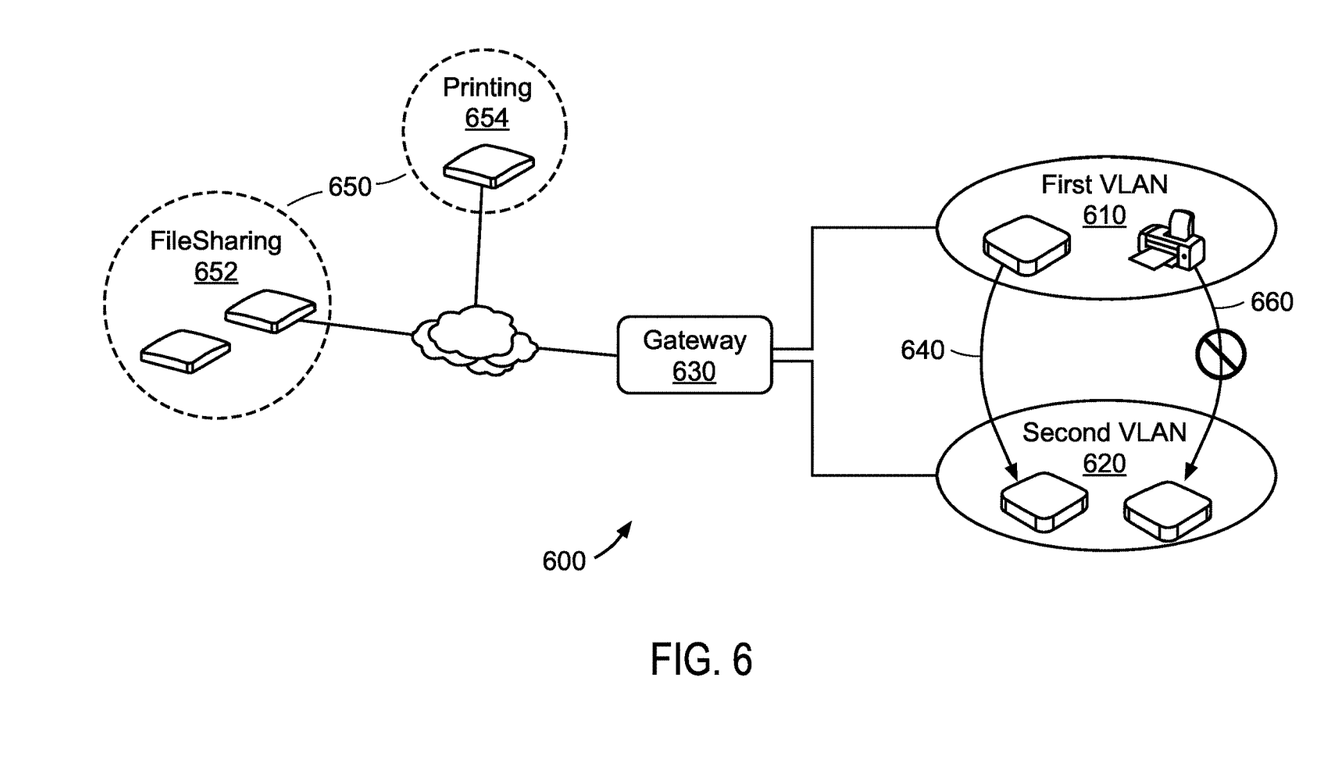
FIG. 6 is an illustrative block diagram of a network configuration 600 related to network access according to some embodiments of the invention.

FIG. 6 is a block diagram illustrating a system 600 providing zeroconf services across multiple domains implementing bridging, fencing and filtering. The gateway 630 includes a processor, transceiver, memory and the like necessary to create and configure a zeroconf service bridge 640 between the first network 610 and the second network 620 to allow a device of one network to utilize the service of the other network. The gateway 630 may further control a network fence 650 that restricts use of a bridged service based on proximity to the service point 652, 654, respectively. The gateway 630 may also provide filtering 660 that controls services on a per device/service basis, where for example, printing service between the first network 610 and the second network 620 is prohibited despite the bridge between the networks that allow other services.

EXAMPLES

The features described in the embodiments above may be applied to any number of environments such as those discussed below, but is not limited to these disclosed examples.

In hospitality/guest service environments such as hotels and conference centers, having service point devices available in particular rooms or areas such as conference rooms and business centers is desirable. However, having access to a service point providing the same service in adjacent rooms may be confusing to the end user and lead to unintended connections. In these cases, a zeroconf fence around a particular AP or room would prevent the user from having to pick from a long list of potential service point devices as well as preventing accidental cross talk between rooms.

The following scenario is contemplated, where each guest room in a hotel is assigned a VLAN and the system knows, via authentication or other means, which client devices belong to the guest in each room. The guest devices remain on the room VLAN no matter where it travels within the hotel property such that guest devices may still access and form connection to the guest room even when the guest device is itself not in the guest room. In such an embodiment, the notion of local is virtualized across the network such that a physical boundary would no longer apply.

In another example involving enterprise networks, more and more client devices are brought to the office. This creates challenges for administrators in controlling which client devices access the network, securing access for internal and external users to service point devices such as projectors and speakers for presentations. As discussed above, bridging and filtering allow for selectively making services available across VLANs with different security requirements, and multicast fencing allows for direct device to device communication without generating large amounts of base-rate traffic on wireless networks.

One of ordinary skill in the art will readily recognize the applicability of the invention to any multicast protocol. Furthermore, the concepts of some embodiments herein are described using a VLAN for teachers and for students solely for ease in understanding embodiments herein and should not be so limited. Embodiments described herein apply to other VLANs, and any number of groups and/or VLANs.

Certain embodiments of the disclosed inventions can facilitate the management of networks, such as a Bonjour network system. This can be accomplished, for example, through the use of a user interface that strips the background information and requires little knowledge of the underlying protocols according to some embodiments of the invention. Examples also include Bonjour Browsing in a gateway that provides administrators visibility in the number and type of services which are being advertised on their networks, allowing for informed policy decisions and targeting of particular service types for management. Browsing identifies services being targeted for bridging, filtering and fencing.

The system may be extended on the AP to support generic multicast filtering and routing rules on a per-client basis to enable selective bridging from a wired side of the link and within the local broadcast domain.

The embodiments disclosed here can be applied with some adaptions to Universal Plug and Play (UPnP). Many in-room entertainment systems are provided in a UPnP ecosystem and include other Digital Living Network Alliance (DLNA) devices and applications.

Aspects of the disclosures here can help simplify managing services discovery over Wi-Fi (e.g. UPnP, Bonjour), selectively bridge traffic based on service type, control which multicast traffic crosses networks, and supports per AP and per AP group fencing.

CONCLUSION

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of providing zero configuration (zeroconf) networking, comprising the steps of:
   bridging a zeroconf multicast service discovery query by a gateway from a first multicast domain to a second multicast domain;
   receiving by the gateway a multicast service advertisement of the second multicast domain for the first multicast domain in response to the bridged multicast service discovery query; and
   filtering by the gateway the bridged multicast communication for service between the first multicast domain and the second multicast domain;
   wherein the multicast domains are Virtual Local Area Networks (VLANs) mapped to separate service set identifiers (SSIDs).

2. The method of claim 1, further comprising:
   fencing access to a zeroconf service from the second multicast domain to the first multicast domain by the gateway on the basis of a pre-determined proximity.

3. The method of claim 2, wherein the pre-determined proximity includes at least one of a proximity to an access point (AP), AP group, radio frequency (RF) neighbors, and geographic area.

4. The method of claim 1, further comprising:
   fencing access to a zeroconf service from the second multicast domain to the first multicast domain by the gateway on the basis of a set of predetermined multicast addresses.

5. The method of claim 1 wherein the filter is on the basis of selectable options.

6. The method of claim 1 wherein the filter is based on service type.

7. A gateway providing zero configuration (zeroconf) networking, comprising:
   a transceiver, in communication with a processor and a memory, configured for,
   bridging a zeroconf multicast service discovery query from a first multicast domain to a second multicast domain;
   forwarding a multicast service advertisement of the second multicast domain to the first multicast domain in response to the multicast service discovery query bridged from the first multicast domain; and filtering the bridged multicast communication for service between the first multicast domain and the second multicast domain on the basis of a service type;

wherein the multicast domains are Virtual Local Area Networks (VLANs) mapped to separate service set identifiers (SSIDs).

8. The gateway of claim 7, wherein the transceiver establishes a zeroconf connection for multicast packets between the first multicast domain and the second multicast domain based on the received multicast service advertisement.

9. The gateway of claim 7, further comprising:
a processor fencing access to a zeroconf service from the second multicast domain to the first multicast domain on the basis of a pre-determined proximity.

10. The gateway of claim 7, further comprising:
a processor fencing access to a zeroconf service from the second multicast domain to the first multicast domain on the basis of a set of predetermined multicast addresses.

11. The gateway of claim 7, wherein the gateway is provided on a trunk port of the multicast domains.

12. A non-transitory computer-readable storage medium comprising computer-executable instructions for a processor to establish a zero configuration (zeroconf) networking, comprising:
a transceiver, in communication with a processor and a memory configured to:
bridge a zeroconf multicast service discovery query from a first multicast domain to a second multicast domain;
receive a multicast service advertisement of the second multicast domain at the first multicast domain in response to the bridged multicast service discovery query; and
filter the bridged multicast communication for service between the first multicast domain and the second multicast domain on the basis of a service type;
wherein the multicast domains are Virtual Local Area Networks (VLANs) mapped to separate service set identifiers (SSIDs).

13. The non-transitory computer-readable storage medium of claim 12, further to:
establish a zeroconf connection for multicast packets between the first multicast domain and the second multicast domain based on the received multicast service advertisement.

14. The non-transitory computer-readable storage medium of claim 12, further to:
fence access to a zeroconf service from the second multicast domain to the first multicast domain on the basis of a pre-determined proximity.

15. The non-transitory computer-readable storage medium of claim 12, further to:
fence access to a zeroconf service from the second multicast domain to the first multicast domain on the basis of a set of predetermined multicast addresses.

* * * * *